United States Patent [19]

Gelles et al.

[11] Patent Number: 5,189,083
[45] Date of Patent: Feb. 23, 1993

[54] ASPHALT ACRYLIC MONOMER-CONTAINING BLOCK POLYMER COMPOSITION

[75] Inventors: Richard Gelles, Sugarland; Donn A. DuBois, Houston, both of Tex.

[73] Assignee: Shell Oil Company, Houston, Tex.

[21] Appl. No.: 853,564

[22] Filed: Mar. 18, 1992

[51] Int. Cl.$^5$ .............................................. C08L 95/00
[52] U.S. Cl. ....................................... 524/68; 524/69; 525/310
[58] Field of Search .................... 524/68, 69; 525/310

[56] References Cited

U.S. PATENT DOCUMENTS 5,002,676  3/1991  Willis et al. ..................... 252/56 R
5,047,457  9/1991  Higgins ................................. 524/60

FOREIGN PATENT DOCUMENTS 0446391  3/1990  European Pat. Off. .

*Primary Examiner*—Paul R. Michl
*Assistant Examiner*—Peter Szekely
*Attorney, Agent, or Firm*—Donald F. Haas

[57] ABSTRACT

A bituminous composition comprising a bituminous component and a polymer which comprises at least one block of a conjugated diolefin and at least one block of an alkyl methacrylate.

18 Claims, No Drawings

ASPHALT ACRYLIC MONOMER-CONTAINING BLOCK POLYMER COMPOSITION

BACKGROUND OF THE INVENTION

Asphalt is a common material utilized for the preparation of paving and roofing materials and also for coatings such as pipe coatings and tank liners. While the material is suitable in many respects, it inherently is deficient in some physical properties which it would be highly desirable to improve. Efforts have been made in this direction by addition of certain conjugated diene rubbers, ethylene containing plastics like EVA and polyethylene, neoprene, resins, fillers and other materials for the modification of one or more of the physical properties of the asphalt. Each of these added materials modifies the asphalt in one respect or another but certain deficiencies can be noted in all modifiers proposed. For example, some of them have excellent weather resistance, sealing and bonding properties but are often deficient with respect to warm tack, modulus, hardness and other physical properties; and some of them improve only the high temperature performance of asphalt, some only improve the low temperature performance of asphalt, while some lack thermal stability or mixing stability with asphalt.

Since the late 1960s, diene polymer rubbers such as styrene-butadiene rubber and styrene-rubber block copolymers such as styrene-butadiene-styrene and styrene-isoprene-styrene block copolymers have been used to dramatically improve the thermal and mechanical properties of asphalts. Practical application of the rubber addition approach requires that the blended product retain improved properties and homogeneity during transportation, storage and processing. Long term performance of elastomer-modified asphalts also depends on the ability of the blend to maintain thermal and chemical stability.

To be suitable for paving materials, the asphalt polymer mixtures should meet the following requirements:

(a) The polymer must be mixable in asphalt and stay mixed during subsequent processing.

(b) The mixture must have the right rheological (flow) properties to prevent rutting which is the permanent deformation of a road caused by repetitive traffic loads. Viscosity is important but elasticity is the most important aspect since the material must be able to recover rather than just resist deformation. This characteristic is most important in warm climates.

(c) The mixture must have good low temperature properties, i.e. resistance to cracking. As a road cools, stresses develop because it cannot shrink uniformly and eventually this will cause cracking. Traffic-caused stresses also contribute. The polymer will lower the temperature at which cracking will occur. This characteristic is more important in cold climates.

(d) Temperature susceptibility of a polymer modified asphalt is a major consideration. Ideally, one would want a binder (asphalt and polymer) which would be "hard" and elastic at elevated temperatures to resist permanent deformation.

To be suitable for synthetic roofing materials, the asphalt polymer mixtures should meet the following requirements:

(a) sufficient resistance to flow at high temperatures,
(b) sufficient flexibility at low temperatures,
(c) workability according to the conventional methods used in the roofing technique,
(d) adequate hot storage stability,
(e) adequate hardness to prevent deformation during walking on the roof, and
(f) if it is to be used as an adhesive, sufficient adhesion.

At the present time, unfunctionalized polymers are being used in paving and roofing applications. Unfunctionalized polymers have certain disadvantages which can cause problems when used in applications such as these. Such disadvantages include undesirably low adhesion to polar materials such as some asphalts, fillers, aggregates, substrates, reinforcing mats, and the like.

There is a need for non-hydrogenated and hydrogenated block copolymers which are both of sufficient molecular weight to significantly enhance the flow properties of bitumen and contain reactive or interactive functional groups. Also, there is a need for low molecular weight block copolymers which contain functionality. Also, there is a need for easy to tailor functional group-containing polymers for the modification of bitumen. Compositions comprising such polymers and bitumen will exhibit improved adhesion to polar substrates, improved compatibility, improved reactivity and curability.

Previous approaches to prepare functionalized block copolymers for use in bituminous compositions have suffered from a number of problems. They usually involve grafting a functional group onto the polymer chain. Free radical initiated grafting, whether peroxide or thermally induced, causes severe base polymer degradation and often gel formation. Polymer degradation can hurt the properties of the final bituminous composition, for example, flow resistance and strength. Lithiation is expensive and causes severe polymer degradation when a non-hydrogenated starting block copolymer is used. Endcapping does not provide a high level of functional groups.

The approach to prepare functionalized block copolymers for use in bituminous compositions described in the present invention is cost effective, gives a non-degraded product which incorporates the functional monomer as part of the polymer chain and lends itself to high and low molecular weight and non-hydrogenated and hydrogenated products.

SUMMARY OF THE INVENTION

This invention relates to a bituminous composition with improved properties over neat asphalt. The bituminous composition comprises a bituminous component and a polymer containing at least one conjugated diolefin block and at least one acrylic monomer block. Preferred acrylic monomers are alkyl methacrylates. Specific applications of this composition include roofing materials, coatings and sealant compositions. Another application is a hot melt asphalt concrete composition comprising from about 80 to about 99 parts aggregate and from about 1 to about 20 parts of a bituminous composition which comprises from about 85 to about 99.999 parts by weight per 100 parts of the bituminous composition of a bituminous component and from about 0.001 to about 15 parts by weight per 100 parts of the bituminous composition of a block polymer of at least one conjugated diene and at least one acrylic monomer which is an alkyl methacrylate wherein the alkyl group has up to 14 carbon atoms inclusive. An example is t-butyl which has the formula:

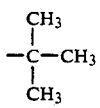

DETAILED DESCRIPTION OF THE INVENTION

The bituminous component in the bituminous-polymer compositions according to the present invention may be a naturally occurring bitumen or derived from a mineral oil. Also, petroleum derivatives obtained by a cracking process, pitch and coal tar can be used as the bituminous component as well as blends of various bituminous materials. Any asphalt may be used.

Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils.

The polymers which may be used according to the present invention are polymers of conjugated dienes and acrylic monomers of the formula described above such as alkyl methacrylates or derivatives of alkyl methacrylates such as hydrolyzed alkyl methacrylates or anhydride derivatives thereof. Other suitable acrylic monomers include acrylates, such as t-butyl acrylate; cyclic alkyl methacrylates, such as 2,6-dimethylcyclohexyl methacrylate; and acrylates in which the alkyl group contains an ether linkage, such as tetrahydrofuran acrylate. Copolymers containing two or more conjugated dienes are useful herein. Copolymers of conjugated dienes and acrylic monomers with vinyl aromatic monomers are preferred and both random and block copolymers thereof are useful herein. The description which follows is described in terms of block copolymers of conjugated dienes, alkyl methacrylates and vinyl aromatic hydrocarbons but it is applicable also to the other polymers described in this paragraph. This means that this invention encompasses functionalized polymers which are not block copolymers but which incorporate the functionality as described below.

The present invention encompasses polymers which are both high and low in molecular weight, as well as in between. High molecular weight polymers include those up to several million molecular weight as defined by gel permeation chromatography (GPC) peak molecular weight of the main species. Low molecular weight polymers include those of only 1000 molecular weight or even less. In all cases these polymers contain both conjugated dienes and acrylic monomers (alkyl methacrylates).

The preferred base polymers of the present invention are block copolymers of conjugated dienes, acrylic monomers such as alkyl methacrylates or their derivatives and vinyl aromatic hydrocarbons. Such block copolymers may be multiblock copolymers of varying structures containing various ratios of the monomers including those containing up to about 60% by weight of vinyl aromatic hydrocarbon. At higher vinyl aromatic hydrocarbon contents, the polymers are not very compatible with bitumens. Thus, multiblock copolymers may be utilized which are linear or radial, symmetric or asymmetric, and which have structures represented by the formulae, ABAC, ABC, BC, BAC, CABAC, CBC, $(CB)_nX$, $(BC)_nX$, $(CB)_nXA_m$ $(BC)_nXA_m$, $(CB)_nXB_m$ $(BC)_nXB_m$, etc. where A is the vinyl aromatic hydrocarbon, B is the diene, C is the acrylic monomer, X is a coupling agent and n and m are integers from 1 to 50. These are just some of the structures possible. Their finite number is not meant to limit the scope of the invention. It is not necessary but B can be a polymer block of a conjugated diene that has been hydrogenated. As can be seen in the examples, hydrogenation of the diene is sometimes preferred.

It may be desirable to acid functionalize these block copolymers of methacrylate and rubber. However, the routes to acid functionalizing involve exposing the polymer to: (1) heat which eliminates isobutylene to form methacrylic acid, or (2), hydrolysis of the ester group by heating (70°–90° C.) a polymer solution in the presence of an acid or acid catalyst. Both routes can degrade and/or crosslink unsaturated rubber. To circumvent this problem the rubber block may be hydrogenated. An alternate route to acid functionalization of styrene-rubber copolymers is possible by sequentially polymerizing a segment of polymethacrylate onto one end of the styrene-rubber to make an "ABC" type polymer. The acid functionality can then be made in situ during the acid wash stage of catalyst removal.

The preferred polymers for use herein are block copolymers which contain a block of conjugated diene and a block of alkyl methacrylate because such polymers are compatible in asphalt and improve the low temperature properties of asphalt as well as offering improved adhesion, reactivity, crosslinkability, etc.

The block copolymers may be produced by any well known block polymerization or copolymerization procedures including the well-known sequential addition of monomer techniques, incremental addition of monomer technique or coupling technique. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. The manufacture of such polymers containing alkyl methacrylates is described in U.S. Pat. No. 5,002,676 and copending commonly assigned application Ser. No. 525,812, filed May 21, 1990, both of which are herein incorporated by reference.

Conjugated dienes which may be utilized to prepare the polymers and copolymers include those having from 4 to 8 carbon atoms and also include 1,3-butadiene,2-methyl-1,3-butadiene(isoprene),2,3-dimethyl-1,3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tert-butylstyrene, 2,4-dimethylstyrene, alpha-methylstyrene, vinylnapthalene, vinylanthracene and the like. The preferred vinyl aromatic hydrocarbon is styrene.

Alkyl methacrylates are preferred for use herein and those employed herein include methacrylates wherein the alkyl group has up to 14 carbon atoms inclusive. Derivatives of these polymers are also included herein, such as, for example, polymers with partially or completely acidified methacrylate groups, their anhydrides, their ionomers, their reaction products with alcohols and amines, and the like. Derivatives of alkyl methacrylates include methacrylic acid, methacrylic acid salts (for example, zinc, sodium and quaternary ammonium salts) and anhydrides formed between adjacent acid units by heating. It should be noted that derivatization of the methacrylate group can be carried out prior to adding the polymer to bitumen or in situ after the polymer is added to bitumen. The in situ reaction requires a reactive ester group such as t-butyl or 1,1-dimethyl alkyl ester. Catalysts such as acids and bases can be added to aid the in situ conversion in asphalt. Illustrative of such methacrylate esters are methyl methacrylate, ethyl methacrylate, sec-butyl methacrylate, t-butyl methacrylate, i-amyl methacrylate, hexyl methacrylate, decyl methacrylate and dodecyl methacrylate. Largely because of ease of polymerization, the preferred alkyl methacrylates are branched-butyl methacrylates, i.e., isobutyl methacrylate and t-butyl methacrylate. The desired poly(alkyl methacrylate) block is produced by directly polymerizing the corresponding alkyl methacrylate monomer or alternatively the desired block is obtained by polymerizing a more easily polymerizable methacrylate and subsequently transesterifying the product to introduce the desired alkyl group. It is also possible to copolymerize randomly or by sequential addition two or more different acrylic monomers in the acrylic monomer block. Tertiary butyl methacrylate (TBMA) is preferred because of ease of purification and polymerization, and because it undergoes thermolysis at temperatures as low as about 180° C.

The present invention works with both unhydrogenated and hydrogenated polymers. Hydrogenated ones are useful in certain circumstances. While unhydrogenated diene polymers have a number of outstanding technical advantages, one of their principal limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and U.S. Pat. No. Re. 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

The use of the polymers described above is generally advantageous in bituminous compositions. Examples include applications in which the bituminous composition must show enhanced adhesion to polar surfaces and applications in which enhanced reactivity is required. Some specific examples include hot melt asphalt concrete paving compositions (better adhesion to aggregate), self-adhesive water proofing products (better adhesion to substrates such as concrete or wooden roof decks, for example) which can be used in roofing, as building foundation liners or as storage tank liners. Other applications include paving chip seals (better adhesion to chips), roof coatings (improved adhesion to substrates), shingle or roll roofing coating compositions (better adhesion to granule or chip surfacing and better adhesion to the reinforcement) and glass mat saturant compositions for shingles, roll roofing and built-up roofing (better adhesion to the mat so that the saturated mat becomes stronger). These bituminous compositions are also advantageous because they can be cured by addition of a curing agent which is capable of reacting with two or more acrylic monomers or their derivatives.

The composition of the present invention generally comprises 100 parts by weight of a bituminous component and from about 0.001 to about 45 parts by weight per 100 parts of the composition of the polymer described above. If less than about 0.001 parts of the polymer of the invention is used, then the composition does not exhibit enhanced adhesion, reactivity, compatibility and the like. If more than about 45 parts are used, the composition may be too high in viscosity depending upon the specific polymer structure. If more than about 25 parts are used, the compositions are too costly. However, the range of 25-40 parts polymer is of interest because often master batches are prepared at a manufacturing site and let down with additional bitumen later in the field.

The compositions of the present invention may optionally include other ingredients like fillers such as ground tires or inorganic fillers like talc, calcium carbonate and carbon black. The composition may also include resins and oils and other components such as stabilizers. It may also include other polymers, for example, other polymers of conjugated diolefins. It is preferred that the bituminous component be compatible with the polymer described above. Compatible asphalts are those which show little or no tendency for a low polymer content phase to separate from the asphalt-polymer mixture and are usually low in asphaltene content.

Hot melt asphalt concrete compositions according to the present invention are especially advantageous. Hot melt asphalt concrete compositions according to the present invention will normally contain from about 80 parts to about 99 parts by weight of aggregate and from about 1 part to about 20 parts of a bituminous composition which is generally comprised of about 85 to about 99.999 parts by weight per 100 parts of the bituminous composition of a bituminous component and from about 0.001 parts to about 15 parts by weight per 100 parts of the bituminous composition of one of the polymers discussed above. If less than about 0.001 parts of the polymer is used, then improved adhesion between bitumen and aggregate is not obtained and if more than 15 parts of the polymer is used, then the composition is too costly and high in viscosity. Compatible asphalts as discussed above are preferred because there is less tendency for the polymer and asphalt to phase separate as a result of heat aging, and asphalts with good flow resistance prior to polymer addition are preferred at very low polymer concentrations because at very low polymer concentrations the polymer does not contribute strongly to other properties such as deformation resistance, i.e. rutting resistance. In other words, at low polymer concentrations asphalts with good rutting resistance on their own are preferred. Such asphalts tend to be less compatible but not necessarily if the proper crude is chosen. The bituminous composition may optionally include other ingredients such as fillers, such as ground tires or inorganic fillers. The composition may also include resins and oils and stabilizers. It may also include other polymers, for example, non-functionalized polymers of conjugated diolefins.

Aggregate is basically rocks and sand. It is intended to be mixed with the bituminous composition to form the hot mix asphalt concrete. The bituminous composition is the binder which holds the aggregate together.

In using the bituminous composition of the present invention in hot melt asphalt concrete, it is preferred that these polymers comprise from about 0.01 to about 8 parts by weight per hundred parts by weight of the bituminous composition. However, if it is desired to achieve the maximum anti-stripping results in the most cost effective manner, it is most preferred that the polymers comprise from about 0.5 to about 4 parts by weight per hundred parts by weight of the bituminous composition.

The specific structure of the acrylic monomer-containing polymer of interest depends upon the application of interest. For example, ionomers, (partially or completely neutralized), i.e. salt forms of acidified TBMA-containing polymers will give greater flow resistance to its asphalt blends than acidified analogs.

If ionomer formation is impractical or hurts performance attributes, then polymers which greatly enhance the flow resistance of asphalt in addition to improving properties associated with the acrylic monomer group may be utilized. These polymers should have two or more vinyl aromatic hydrocarbon blocks, i.e. polystyrene blocks. These polymers should have a vinyl aromatic hydrocarbon content of less than about 60% so that they are compatible with asphalt and greater than about 10% so that they will provide flow resistance at reasonable molecular weight. They should have molecular weights greater than about 30,000 so that they improve flow resistance at low use levels and less than about 1,000,000 so that they are compatible and readily mixable with asphalt. The 1,000,000 molecular weight limit refers to linear structures. Radial or star polymer with from three to about fifty arms are also envisioned. Their uncoupled precursor should have a molecular weight below about 500,000. After coupling, they could have a molecular weight of up to 50 times 500,000, or 25,000,000.

High acrylic monomer content polymers and high molecular weight acrylic monomer blocks are also contemplated herein. Acrylic monomer contents of up to 80% or even as high as 99% and acrylic monomer block molecular weights up to 300,000 are envisioned. However, some acrylic monomers, such as TBMA, are presently expensive compared to monomers typically used commercially. Lower acrylic monomer contents, such as 1 to 30%, and block molecular weights are advantageous at the present time, at least from a cost standpoint. As little as 0.1% of the acrylic monomer will provide the advantages of the invention but the results are better as the amount of acrylic monomer used is increased.

Acrylic monomer-containing polymers which do not improve the flow resistance of bitumen dramatically are of interest when combined with bitumen, or when combined with bitumen and other polymers (which provide the flow resistance; e.g., block copolymers of conjugated dienes and styrene which contain two or more styrene blocks, provided that they are effective at providing interfacial properties, or provided that they are crosslinked or reacted. Examples of polymers which are compatible with asphalt and effective at interfaces include, wherein A is a polymer block of a vinyl aromatic hydrocarbon and B is a block of a conjugated diene and C is a polymer block of an acrylic monomer or its derivatives: ABC, BC, BAC, CBC, $(BC)_nX$, $(CB)_nX$ $(BC)_nXB_m$, $(CB)_nXB_m$ etc. where X is a coupling agent linkage, and n=1-50 and m=1-50.

Polymers which are easily crosslinked in asphalt are typically of high molecular weight so that less crosslinks per volume or weight of polymer are required. Furthermore, polymers which are easily crosslinked in asphalt and contain an acrylic monomer (or derivative) block include ones with many arms so that less crosslinks per volume or weight of polymer are required. Crosslinking can be carried out by conventional approaches such as sulfur or free radical or by reacting through methacrylate or methacrylate derivative groups.

Low molecular weight (less than 30,000 molecular weight) acrylic monomer-containing polymers are of interest for blending with asphalt when they are active at interfaces or when they are cured or reacted to form higher molecular weight polymers. Low molecular weight acrylic monomer-containing polymers are easily mixed into asphalt.

EXAMPLE 1

Improved Adhesion to Aggregate in Hot Mix Asphalt Concrete Stripping Test

Three tertiary-butyl methacrylate (TBMA) containing block copolymers were evaluated. The first, A, is a sequentially polymerized styrene (6.2)-butadiene (34.3)-styrene (7.4)-TBMA (5). Here the molecular weights (shown in parenthesis) are given in thousands. The molecular weights of the first three blocks were determined by gel permeation chromatography (GPC) using peak molecular weights. The molecular weight of the TBMA block was calculated from the monomer to initiator ratio. Block compositions were determined by C13 NMR spectroscopy and agreed well with the calculated monomer to initiator ratio. The vinyl content of the butadiene block was approximately 40 mol %. The second TBMA containing block copolymer, B, is the selectively hydrogenated and acid washed A (the polymer was acid washed to remove the spent hydrogenation catalyst). Thus, B may contain small amounts of TBMA in the acid form. B contains less than 2% of the unsaturation in the butadiene block of its precursor A.

Blends of the polymers A and B at 2% w in Deer Park AC-5 asphalt made by blending road flux and propane deasphalted material available from Shell Oil Company at its Deer Park, Tex. refinery were prepared using a laboratory Silverson high shear mixer set at 3000 rpm. The polymers were added to the preheated asphalt and mixed at the desired temperatures for various times.

The blends were tested for stripping using the following procedure. Blends were first cooled to 120° C. 20 grams of the limestone aggregate was heated in an air circulating oven at 120° C. for one hour. The aggregate was removed and mixed with the bitumen blends (1.6 grams) by stirring with a spatula to ensure uniform coating. The coated hot aggregate was then placed in 400 ml of boiling deionized water for 10 minutes. The aggregate was removed from the water and allowed to cool. The amount of asphalt stripped was visually estimated for each piece of aggregate.

The aggregate pieces were divided into a discrete distribution with bare patches (no asphalt) of: none, <25%, 25-50%, 50-75%, 75-100%.

An averaged stripping index was calculated:

stripping index=[(#<25%)(1)+(#25-50%)(2)+(# 50-75%)(3)+(#75-100%)(4)] divided by the total # of pieces of aggregate.

A stripping index of zero means no bare patches on the aggregate while an index of four means almost all of the asphalt stripped. Lower is better.

| Blend | Mix Time (Min) | Mix Temp (°C.) | Stripping Index |
|---|---|---|---|
| Neat DP AC-5 | No Extra Heating | 121 | 2.4 |
| Neat DP AC-5 | 120 | 220 | 2.2 |
| 2% A SBS-TBMA | 120 | 180 | 1.8 |
| 2% B SEBS-TBMA | 30 | 170 | 1.7 |
| 2% B SEBS-TBMA | 30 | 180 | 2.4 |
| 2% B SEBS-TBMA | 120 | 180 | 0.6 |
| 2% B SEBS-TBMA | 30 | 200 | 1.5 |
| 2% B SEBS-TBMA | 120 | 200 | 1.1 |
| 2% B SEBS-TBMA | 30 | 220 | 0.5 |
| 2% B SEBS-TBMA | 120 | 220 | 1.0 |

The above results with B, the SEBS-TBMA, show that TBMA containing block copolymers can provide improved adhesion between a polymer modified bitumen and an aggregate in a hot mix asphalt concrete system.

It is expected from melt reactivity studies of neat (not blended with asphalt or other ingredients) TBMA-containing polymers that TBMA groups on the polymers would slowly undergo at least partial conversion to reactive methacrylic acid groups when the polymers are mixed with bitumen at temperatures close to (or greater than) 180°-200° C. Then, once acid groups in adjacent repeat units are formed, they should be able to combine rapidly to form anhydride groups. Fast conversion from adjacent acid groups to the anhydride is expected as long as the temperature is greater than the boiling point of water, 100° C. It is further expected that acid and anhydride groups are more desirable than the staring ester group to obtain adhesion to aggregate. It is noted that conversion of the ester group to groups of better performance can be done with the polymer prior to mixing with asphalt or in situ during blending with asphalt. It is further noted that conversion of ester to acid can be aided by catalysts such as acids or bases.

Admittedly all the above results do not follow the expected trend of less stripping with longer mix times and higher mix temps. The simplest explanation is that there is some variability in the stripping test and in the in-situ chemistry. With a quick glance, the eye ranks systems on this aggregate with stripping indices between 0.5-1.1 as very similar. In addition, there are not large differences between systems with indices between 1.7-2.4. They all exhibit severe stripping. The simplest explanation for the results with B is that blends made with this polymer resisted stripping if heated at 180° C. for two hours, and if heated at higher temperature, for less time. As stated above, it is believed that under such conditions, the methacrylic ester groups are at least partially converted to acid and anhydride groups.

The precursor to B, A, did not perform as well as its hydrogenated analog. A possible explanation is that it does not contain any preformed methacrylic acid groups that may act as a thermolysis catalyst. This can be easily overcome by acidifying (or partially acidifying) it prior to asphalt addition, or by adding hydrolysis catalyst during blending with asphalt.

EXAMPLE 2

Polymer Containing a Derivative of the Methacrylate Group

Polymer B was hydrolyzed (TBMA group converted to the methacrylic acid repeat unit) by refluxing a toluene solution of the polymer plus catalytic amounts of para-toluene sulfonic acid. The refluxing was carried out under nitrogen for one hour. Infrared spectroscopy showed complete conversion to the acid (and a very small amount of anhydride) after refluxing for one hour (acid-IR: 1708 cm$^{-1}$; anhydride-IR: 1801 cm$^{-1}$ and 1760 cm$^{-1}$). All blends were mixed 120 minutes at 180° C. Stripping indices were calculated via bare batches and also by bare plus thin patches. The thin patches appear to have a very thin layer of oil left while the bare batches have no asphalt.

| Blend | Bare Patch Stripping Index | Bare Plus Thin Patch Stripping Index |
|---|---|---|
| 0.5% B | 2.0 | — |
| 2% B | 0.6 | 1.2 |
| 4% B | 0.7 | 2.4 |
| 0.5% Hydrolyzed | 1.8 | — |
| 2% Hydrolyzed | 0.6 | 0.6 |
| 4% Hydrolyzed | 0.4 | 0.5 |

Hydrolyzed Polymer B performs better than Polymer B with this aggregate/asphalt combination when the blends are mixed for 120 minutes at 180° C. Hydrolyzed Polymer B gives very thick uniform films on the aggregate after the boiling test. It is believed that Polymer B was not completely hydrolyzed when it was mixed in Deer Park AC-5 asphalt for 120 minutes at 180° C. in Example 1. It is also believed that a hydrolyzed version of Polymer A (from Example 1) would perform well in this application.

EXAMPLE 3

Comparison to Prior Art

In this example, Prior Art Polymer 1 was evaluated in addition to TBMA-containing polymers. Prior Art Polymer 1 is a selectively hydrogenated S-B-S polymer. It has a structure similar to Polymer B but without a TBMA block. Polymer B was again evaluated as is (ester form), in the hydrolyzed form (prepared in Example 2) and in the anhydride form. Polymer C was evaluated in the hydrolyzed form. Polymer C was hydrolyzed with the procedure described in Example 2.

Polymer C is a sequentially polymerized styrene (7.4)-butadiene (35.1)-TBMA (10). The vinyl content of the butadiene block is approximately 40 mol %. The block sizes of the styrene and butadiene blocks were determined by GPC of the styrene-butadiene diblock (prior to TBMA addition). The molecular weight of the TBMA block was calculated from the monomer to initiator ratio. Polymer C contains one diphenyl ethylene unit between the butadiene and TBMA blocks. Polymer C was endcapped with diphenyl ethylene prior to TBMA addition.

Polymer B was converted to the anhydride form by extruding it through a 15 mm Baker Perkins twin screw corotating extruder at 275 rpm and 260° C. Residence time was approximately 40 seconds in the extruder. The polymer was analyzed by infrared spectroscopy which showed complete conversion to the anhydride.

The polymers were tested for stripping as in Examples 1 and 2. A few minor changes were made—100 gm of limestone aggregate and 8 gm of asphalt blend were used in Example 3. In addition, an AC-20 asphalt available from Ashland Oil Co. was used. All blends were mixed for 120 minutes at 180° C.

| Blend | Bare Plus Thin Patch Stripping Index |
|---|---|
| 0.5% Prior Art Polymer 1 | 2.0 |
| 0.5% B | 0.8 |
| 0.5% Hydrolyzed B | 1.3 |
| 0.5% Anhydride B | 1.1 |
| 4.0% Prior Art Polymer 1 | 2.6 |
| 4.0% Hydrolyzed B | 0.4 |
| 4.0% Anhydride B | 0.3 |
| 4% Hydrolyzed C | 1.0 |

The polymers of the present invention (Polymers B and C) perform better than Prior Art Polymer 1. With this asphalt/aggregate pair and the blending conditions given above, the ester form (Polymer B), acid form and anhydride form perform the same within experimental error. A possible explanation is that complete acidification of Polymer B occurs in the Ashland AC-20 asphalt during blending for two hours at 180° C. It is also possible that since Ashland AC-20 does not strip so readily from the limestone aggregate as the Deer Park AC-5 used in Example 1 that stripping performance with its polymer blends does not depend as strongly on the amount of methacrylate groups that have been acidified. Further, it was expected that the acid and anhydride forms would perform equivalently since fast conversion from acid to anhydride should take place above 100° C.

We claim:

1. A bituminous composition comprising a bituminous component and a polymer comprising at least one conjugated diolefin block and at least one alkyl methacrylate block wherein the alkyl group has up to 14 carbon atoms.

2. The composition of claim 1 wherein the polymer also comprises at least one block of a vinyl aromatic hydrocarbon.

3. The composition of claim 1 wherein the alkyl methacrylate is tertiary butyl methacrylate.

4. The composition of claim 1 wherein the polymer comprises from about 0.001 parts to about 45 parts by weight per 100 parts of the bituminous composition.

5. The composition of claim 2 wherein the alkyl methacrylate is a hydrolyzed alkyl methacrylate or an anhydride derivative thereof.

6. The composition of claim 1 wherein the polymer is selectively hydrogenated.

7. A hot melt asphalt concrete composition comprising:
   (a) from 80 parts to 99 parts by weight of aggregate, and
   (b) from 1 part to 20 parts by weight of a bituminous composition which is comprised of:
      (i) from 85 parts to 99.999 parts by weight per 100 parts of the bituminous composition of a bituminous component, and
      (ii) from 0.001 parts to 15 parts by weight per 100 parts of the bituminous composition of a polymer comprising at least one conjugated diolefin block and at least one alkyl methacrylate block wherein the alkyl group has up to 14 carbon atoms.

8. The composition of claim 7 wherein the polymer also comprises at least one block of a vinyl aromatic hydrocarbon.

9. The composition of claim 7 wherein the alkyl methacrylate is tertiary butyl methacrylate.

10. The composition of claim 8 wherein the alkyl methacrylate is a hydrolyzed alkyl methacrylate or an anhydride derivative thereof.

11. The hot melt asphalt concrete composition of claim 7 wherein the polymer comprises from 0.01 parts to 8 parts by weight per hundred parts by weight of the bituminous composition.

12. The hot melt asphalt concrete composition of claim 11 wherein the polymer comprises from 0.5 parts to 4 parts by weight per hundred parts by weight of the bituminous composition.

13. The composition of claim 7 wherein the polymer is selectively hydrogenated.

14. The composition of claim 1 wherein the polymer contains at least 0.1% of the alkyl methacrylate.

15. The composition of claim 14 wherein the polymer contains from 1% to 30% of the alkyl methacrylate.

16. The composition of claim 1 wherein the acrylic monomer is an alkyl methacrylate.

17. The composition of claim 1 wherein the acrylic monomer is a hydrolyzed alkyl methacrylate or an anhydride derivative thereof.

18. The composition of claim 7 wherein the acrylic monomer is a hydrolyzed alkyl methacrylate or an anhydride derivative thereof.

* * * * *